United States Patent Office 2,848,521
Patented Aug. 19, 1958

2,848,521
TREATMENT OF HYDROCARBON CONVERSION CATALYSTS

Walter B. Polk, Borger, Tex., assignor to Phillips Petroleum Company, a corporation of Delaware No Drawing. Application August 30, 1955
Serial No. 531,578

12 Claims. (Cl. 260—680)

This invention relates to the conversion of hydrocarbons and to the treatment of catalysts utilized in conjunction therewith. In one aspect this invention relates to treatment of iron oxide-containing materials prior to use of same as hydrocarbon conversion catalysts. In another aspect this invention relates to treatment of a catalyst comprising an iron oxide, prior to use of same as a hydrocarbon conversion catalyst, by contacting the said catalyst with an oxidizing agent in admixture with at least one of hydrogen and a hydrocarbon. In still another aspect this invention relates to treatment of an iron oxide promoted with at least one of a suitable alkalizing agent and chromium oxide prior to use of same as a catalyst in a catalytic dehydrogenation of $C_4$ hydrocarbons, by contacting the said catalyst with steam containing a minor proportion of at least one of hydrogen, and a low molecular weight hydrocarbon.

Numerous iron oxide-containing materials exhibit utility as catalysts in various hydrocarbon conversion processes. As is characteristic of many types of conversion catalysts, iron oxide catalysts exhibit at the start of the period of their use a more or less extended induction period during which only an inferior amount of desired conversion is effected. Thus, by way of example, in initiating dehydrogenation of a butene to butadiene in the presence of such type catalyst, a high initial olefin conversion is obtained with, however, the lowest diolefin yield of the entire period indicating an abnormal rate of destruction of the diolefin formed and markedly reducing the average diolefin yield over the entire conversion period. It is, therefore, desirable to eliminate or substantially reduce the length of such an induction period in the utilization of such type catalyst in the conversion of hydrocarbons so as to eliminate or substantially reduce abnormal low product yields and highly inefficient initial reactions.

This invention is concerned with a method for treating iron oxide type catalysts so as to eliminate or substantially reduce the induction period normally encountered in the utilization of such catalyst during initial operation. This invention is advantageously applied to pretreatment of iron oxide catalysts employed in the dehydrogenation of hydrocarbons, particularly $C_4$ hydrocarbon dehydrogenation to produce $C_4$ mono- and diolefins.

An object of this invention is to provide a process for treatment of catalysts comprising iron oxides. Another object is to provide a process for the substantial reduction of induction period ordinarily associated with iron oxide type catalysts prior to use of same. Another object is to provide for pretreatment of an iron oxide promoted with at least one of a suitable alkalizing agent and chromium oxide prior to use of same as a catalyst for hydrocarbon dehydrogenation. Another object is to provide for use of hydrogen and/or a hydrocarbon in conjunction with an oxidizing gas in the treatment of iron oxide type catalysts prior to use of same in effecting hydrocarbon conversion. Still another object is to provide for pretreatment of an alkalized chromium oxide promoted iron oxide prior to use of same as a catalyst in the catalytic dehydrogenation of $C_4$ hydrocarbons to less saturated $C_4$ hydrocarbons such as butene dehydrogenation to produce butadiene, whereby to substantially reduce induction period ordinarily encountered in such operations. Other aspects and objects of this invention and its several related particulars are evident from a perusal of this disclosure and the appended claims.

In accordance with this invention a catalyst comprising an iron oxide is contacted, prior to utilization of same as a hydrocarbon conversion catalyst, with an oxidizing gas containing at least one of hydrogen and a hydrocarbon; one concept of this invention providing for contacting a catalyst comprising an iron oxide prior to use of same as a catalyst for hydrocarbon dehydrogenation with steam in admixture with a minor proportion of at least one of hydrogen and a low molecular weight hydrocarbon; another concept of this invention providing for contacting a catalyst comprising an iron oxide promoted with at least one of a suitable alkalizing agent and chromium oxide prior to use of same as a catalyst in the dehydrogenation of a $C_4$ hydrocarbon to produce a less saturated $C_4$ hydrocarbon, e. g., butene dehydrogenation to produce butadiene, with steam in admixture with a minor proportion of at least one of hydrogen and a hydrocarbon containing from one to four carbon atoms in the molecule; whereby the induction period normally encountered in the utilization of such catalysts, as described, is prevented or substantially reduced.

Exemplary of hydrocarbon dehydrogenation processes to which this invention is applicable are butene dehydrogenation to produce butadiene, butane dehydrogenation to produce butene, and the dehydrogenation of paraffinic and/or olefinic naphthas in the presence of catalyst composed of an iron oxide promoted with at least one of a suitable alkalizing agent and chromium oxide.

Any suitable oxidizing gas can be employed in the practice of this invention, such as air, air-flue gas mixtures, air-residue gas mixtures, steam, or the like, steam being now preferred. The amount of hydrogen and/or hydrocarbon employed in conjunction with the oxidizing gas is that which is sufficient to effect desired pretreatment, any desired proportions of hydrogen and/or hydrocarbon being utilized, from 0.5 to 5 volumes of hydrogen and/or 0.5 to 5 volumes hydrocarbon per volume of catalyst being generally employed.

Temperatures employed in carrying out the process of this invention are advantageously at about the same temperature level as that at which the catalyst is to be used in the conversion step proper, although temperatures above or below such levels can be employed as desired. Thus, in treating an iron oxide promoted with at least one of a suitable alkalizing agent and chromium oxide prior to use of same in the dehydrogenation of a $C_4$ hydrocarbon to a less saturated $C_4$ hydrocarbon, the dehydrogenation temperature range generally being within about 1100 to 1300° F., a pretreatment temperature in that range can be utilized although temperatures in a broader range can be utilized, such as from about 1000 to 1400° F.

Space velocity and time conditions utilized in the practice of this invention can be correlated to effect the desired contact of hydrogen and/or hydrocarbon (with oxidizing gas) with the catalyst and with concentration of hydrogen and/or hydrocarbon in the oxidizing gas. Thus, proportions of oxidizing gas with from 1 to 5 volume percent hydrogen and/or 1 to 5 volume percent hydrocarbon can be passed in contact with the catalyst to be pretreated at a space velocity of from 400 to 5000 volumes of total oxidizing gas and hydrogen and/or hydrocarbon per volume of catalyst per hour for duration of from 0.5 to 6 hours, although, when desired, concentration, space velocity and time conditions outside these ranges can be employed.

My invention is in accordance with a preferred embodiment applied to the pretreatment of an iron oxide promoted with at least one of a suitable alkalizing agent and chromium oxide often utilized in various catalytic hydrocarbon dehydrogenation processes. Such an iron oxide catalyst can be prepared by reducing a mass obtained by promoting iron oxide with at least one of an alkalizing agent and chromium oxide. Such a catalyst prior to reduction at a temperature in the range of 650–1300° F. in the presence of hydrogen, is an alkalized iron oxide-chromium oxide, e. g., $Fe_2O_3$—$Cr_2O_3$—$KOH$. In the presence of carbon dioxide the KOH is converted to $K_2CO_3$. Concentrations of from about one to about 40 weight percent chromium oxide and 0.2 to 50 weight percent alkali, calculated as the oxide, are operative, the remainder being iron oxide. Iron oxide preferably constitutes the preponderant proportion of the catalyst and is preferably in excess over all other constituents combined with the possible exception of a diluent. A now preferred catalyst for the said selective hydrogenation comprises 65–95 weight percent iron oxide.

These catalysts can be prepared by mixing or grinding or promoting iron oxide with chromium oxide and incorporating therein a suitable inorganic alkalizing agent, for example, one or more of the common alkalis, e. g., oxides, hydroxides and/or basic salts (e. g. carbonates) of the alkalis or even alkaline earth metals; thus a salt which is decomposable to the oxide is ordinarily employed. In the case of the alkaline earth compounds, salts hydrolyzable to the hydroxide may be used when water is added in the process of catalyst manufacture, e. g., just prior to extrusion. Thus, the salt is ultimately decomposable to the oxide when the catalyst is heated at an elevated temperature. A suitable mixture of nitrates can be thermally decomposed followed by ignition and finally by a reduction at about 850–1000° F. in an atmosphere of hydrogen. Coprecipitation methods, for example coprecipitation of hydrous gels or oxides or sols can also be employed. One skilled in the art can determine by mere routine test the optimum composition, starting materials and modus operandi which yield the desired results in any particular case. Surface area and characteristics can affect the degree of selectivity of some catalysts and, as will be understood by one skilled in the art, the ignition or calcination temperature as well as the reduction can be varied to obtain optimum results in the case of each catalyst and hydrocarbon stream treated. In one method of preparation these catalysts which contain iron, chromia and potassium compounds are prepared by thoroughly admixing or grinding together iron oxide and chromium oxide, then forming a paste thereof with a solution of the desired potassium compound, for example, potassium hydroxide. Upon pelleting and drying, the catalyst can be ignited and then reduced at about 950° F. in hydrogen.

The iron oxide, which is admixed with the remaining catalyst ingredient or ingredients, can be prepared by calcining a precipitated iron oxide in the form of a powder at an elevated temperature, for example in the range 1475–1600° F. until its surface area has been reduced to below about 8 square meters per gram or until its apparent density is equivalent to about 250 pounds per barrel. At this stage the iron oxide is of a brownish-red color and has a formula of $Fe_2O_3$. Further calcination may be effected under reducing conditions in which event the iron oxide will be partly or completely in the form of black $Fe_3O_4$. Since these catalysts are reduced at an elevated reducing temperature prior to use, some elemental iron will be present in the finished catalyst together with iron oxide.

An iron oxide type catalyst prepared as above described is well adapted to the dehydrogenation of $C_4$ hydrocarbon to produce less saturated $C_4$ hydrocarbons, particularly butene dehydrogenation to produce butadiene. In carrying out such a butene dehydrogenation an iron oxide type catalyst is employed as for example one containing from 70–95 percent $Fe_2O_3$ including a minor amount of $Fe_3O_4$, from 3–20 percent chromia, and from 2–20 percent KOH, the hydrocarbon space velocity generally being within the limits of 200 and 500, the temperature being about 1100–1300° F. at a pressure in the order of atmospheric to 15 p. s. i. g. or higher, if desired. Such a butene dehydrogenation process is described in some detail in U. S. Patent 2,625,528, issued January 13, 1953, to William T. Cooper, and is disclosed and claimed in U. S. Patent 2,381,691, issued August 7, 1945, to Walter A. Schulze and John C. Hillyer.

I am not certain as to the mechanism by which the pretreatment of my invention operates. However, with reference to a promoted iron oxide prepared as above described and utilization of same in butene dehydrogenation, there are probably three oxides of iron present, namely FeO, $Fe_3O_4$ and $Fe_2O_3$, of which the one believed most favorable for catalyzing butene dehydrogenation is $Fe_3O_4$ which is in an intermediate state of oxidation. Thus, when regenerating or treating such catalyst in accordance with conventional steaming procedures, iron in the catalyst will tend to become completely oxidized to $Fe_2O_3$ and conversely, when treating same in a reducing atmosphere, e. g., pure hydrogen or carbon, the iron will be reduced to FeO or to some extent to elemental iron. Thus, it appears that induction periods ordinarily encountered such as when employing the presently discussed catalyst, i. e., subsequent to conventional steam treatment, hydrocarbon is necessarily contacted with the catalyst over prolonged periods to reduce the overly oxidized catalyst back to its active state. Similarly, during subsequent and/or succeeding steaming periods, the same sort of oxidation apparently taking place, an induction period is required upon effecting reuse of the said catalyst. Thus, the addition with the oxidizing gas of hydrogen and/or a hydrocarbon during regeneration prevents over oxidation of the catalyst to maintain the same in an intermediate state of oxidation and thereby in immediate readiness for effecting the desired hydrocarbon conversion.

Exemplary of various hydrocarbon fractions that can be advantageously employed in conjunction with oxidizing gas in the pretreatment step of this invention are natural gas, overhead gas from absorption of heavier components from raw natural gas in mineral seal oil, often referred to in the art as MSO absorber overhead, methane, ethylene, propane, propylene and mixtures of these gases.

Although the foregoing describes the practice of this invention as applied to "conventional steaming" periods, it is to be understood that the invention is applied during start-up periods as well as during steaming or regeneration periods. Thus, during start-up the optimum state of oxidation is quickly established so that upon introducing feed into contact with a catalyst, the conversion is initiated within a very short time without the need for first encountering and waiting out the conventional induction time. The invention may in some cases be applied only during the latter part of a "conventional" steaming" or regeneration period, that is just prior to the conversion period for a length of time of about 30 minutes to 2 hours.

When employing catalyst pretreatment in conjunction with catalyst regeneration as described hereinabove, the regeneration and pretreatment period is shortened and processing time is lengthened. The hydrogen and/or hydrocarbon in the treating gas prevents over-oxidation of the catalyst whereas conventionally the catalyst is first over-oxidized and then necessarily reduced, catalyst stability is improved by reducing the amount of catalyst oxidation and subsequent reduction ordinarily required, and over-reduction, as in the case of over-oxidation, is inhibited.

In effecting combustion regeneration of the catalyst in conjunction with pretreatment in accordance with this invention, temperatures in the order of about 1200 to 1400° F. are employed, the oxidizing gas preferably containing from about 0.5 to 5 volume percent of hydrogen and/or 0.5 to 5 volume percent of hydrocarbon, the overall period of regeneration-pretreatment being in the range of from 0.5 to 8 hours, space velocity and pressure conditions employed being those ordinarily employed in accordance with prior art combustion regeneration procedures.

Reasonable variation and modification are possible within the scope of the foregoing disclosure and the appended claims to this invention, the essence of which is that iron oxide type catalysts, either new or regenerated, prior to use of same as catalysts in hydrocarbon conversion processes are pretreated to eliminate or substantially reduce the induction period ordinarily encountered when such catalysts are employed, by contacting same with an oxidizing gas containing at least one of the group of hydrogen and a hydrocarbon; another concept providing for contacting an iron oxide promoted with at least one of a suitable alkalizing agent and chromium oxide prior to use of same as a catalyst for hydrocarbon dehydrogenation with an oxidizing gas, preferably steam, containing a minor proportion of at least one of hydrogen and a hydrocarbon; a now preferred concept providing for contacting an alkalized chromium oxide promoted iron oxide prior to use of same as a catalyst in the catalytic dehydrogenation of $C_4$ hydrocarbons to less saturated $C_4$ hydrocarbons, preferably dehydrogenating butene to butadiene, with steam containing a minor proportion of at least one of hydrogen and a hydrocarbon; all as described herein.

I claim:

1. In the conversion of a hydrocarbon in presence of a catalyst containing iron oxide as an active catalytic ingredient, wherein said catalyst is periodically contacted with an oxidizing gas under oxidizing conditions to remove carbonaceous materials from its surfaces, the improvement comprising maintaining in admixture with said oxidizing gas during said regeneration, from 1 to 5 percent of the volume of said oxidizing gas of at least one of hydrogen and a hydrocarbon containing 1 to 4 carbon atoms per molecule, and thereby preventing over-oxidation of the catalyst to $Fe_2O_3$, whereby substantial reduction of the induction period during said conversion is effected.

2. The improvement of claim 1 wherein said oxidizing gas contains, from 0.5 to 5 volume percent hydrogen and from 0.5 to 5 volume percent of a normally gaseous hydrocarbon.

3. The improvement of claim 1 wherein said oxidizing gas is steam and said steam contains from 1 to 5 volume percent of at least one of said hydrogen and hydrocarbon.

4. In the conversion of a hydrocarbon by dehydrogenation in presence of a catalyst containing iron oxide as an active catalytic ingredient, wherein said catalyst is periodically contacted with an oxidizing gas under oxidizing conditions to remove carbonaceous materials from its surfaces, the improvement comprising maintaining in admixture with said oxidizing gas during said regeneration, from 1 to 5 percent of the volume of said oxidizing gas of at least one of hydrogen and a hydrocarbon containing 1 to 4 carbon atoms per molecule, and thereby preventing over-oxidation of the catalyst to $Fe_2O_3$, whereby substantial reduction of the induction period during said conversion is effected.

5. An improvement according to claim 4 wherein said catalyst is an iron oxide coated with at least one of a suitable alkalizing agent and chromium oxide.

6. The improvement of claim 4 wherein said oxidizing gas is steam, and said steam is admixed with from 1 to 5 volume percent of hydrogen.

7. The improvement of claim 4 wherein said oxidizing gas is steam and said steam is admixed with from 1 to 5 volume percent of a hydrocarbon containing from 1–4 carbon atoms per molecule.

8. In the conversion of a hydrocarbon by dehydrogenation in the presence of a catalyst comprising an alkalized iron oxide-chromium oxide containing on a weight basis from 1–40 percent chromium oxide, from 0.2 to 50 percent alkali calculated as the oxide, and the remainder iron oxide, wherein said catalyst is periodically contacted with steam under oxidizing conditions to remove carbonaceous materials from its surface, the improvement comprising maintaining in admixture with said steam at least one of from 0.5 to 5 volume percent hydrogen and 0.5 to 5 volume percent of a hydrocarbon containing from 1 to 4 carbon atoms per molecule, at a temperature in the range of 1000 to 1400° F., at a space velocity in the range of from 400 to 5000 volumes of said steam admixture per volume of catalyst per hour and for a period of from 0.5 to 6 hours, and thereby preventing over-oxidation of the catalyst to $Fe_2O_3$, whereby substantial reduction of the induction period during said conversion is effected.

9. The improvement of claim 8 wherein said catalyst is contacted with steam in admixture with from 0.5 to 5 volume percent of methane and from 0.5 to 5 volume percent of hydrogen.

10. The improvement of claim 8 wherein said steam is admixed with natural gas.

11. The improvement of claim 10 wherein said natural gas is a residual gas from removal of heavier components from raw natural gas.

12. The improvement of claim 8 wherein said catalyst is contacted with steam in admixture with from 0.5 to 5 volume percent of hydrogen.

References Cited in the file of this patent

UNITED STATES PATENTS

| | | |
|---|---|---|
| 2,405,436 | Laughlin | Aug. 6, 1946 |
| 2,449,295 | Gutzeit | Sept. 14, 1948 |
| 2,626,288 | Ronayne | Jan. 20, 1953 |
| 2,666,086 | Pitzer | Jan. 12, 1954 |